United States Patent [19]

Robinet

[11] Patent Number: 4,623,520

[45] Date of Patent: Nov. 18, 1986

[54] CHEMICAL OXYGEN GENERATOR WITH A LOW CONTENT OF IMPURITIES

[75] Inventor: Jean Robinet, Balma, France

[73] Assignee: Etablissements Ruggieri, Paris, France

[21] Appl. No.: 694,181

[22] Filed: Jan. 23, 1985

[30] Foreign Application Priority Data

Jan. 23, 1984 [FR] France .............................. 84 01004

[51] Int. Cl.⁴ .............................................. A62B 7/08
[52] U.S. Cl. ................................ 422/126; 128/202.26
[58] Field of Search ............... 422/125, 126, 120, 123; 128/202.26, 205.27, 205.28, 202.27, 202.28, 203.26

[56] References Cited

U.S. PATENT DOCUMENTS

| | | | |
|---|---|---|---|
| 3,615,251 | 10/1971 | Klenk | 422/126 X |
| 3,737,287 | 6/1973 | Churchill et al. | 128/202.26 X |
| 3,742,683 | 7/1973 | Sebest et al. | 422/125 X |
| 3,756,785 | 9/1973 | Netteland | 128/202.26 X |
| 3,868,225 | 2/1975 | Tidd | 422/126 X |
| 3,955,931 | 5/1976 | Thompson | 128/202.26 X |
| 4,246,229 | 1/1981 | McBride et al. | 128/202.26 X |
| 4,278,637 | 7/1981 | McBride | 422/126 X |
| 4,427,635 | 1/1984 | Hahn | 422/126 X |

FOREIGN PATENT DOCUMENTS 818004 9/1937 France .
2410481 6/1979 France .

Primary Examiner—Richard L. Chiesa
Attorney, Agent, or Firm—Sughrue, Mion, Zinn, Macpeak and Seas

[57] ABSTRACT

Oxygen generator comprising a casing (1, 10) containing an oxygen generating block (9) whose initiation is ensured by a manually actuated primer (8). The casing is provided with a valve (66) for the outlet of the oxygen. The primer (8) is a thermal primer separated by a gas impervious screen (13) from the material of the gas generating block (9).

8 Claims, 3 Drawing Figures

CHEMICAL OXYGEN GENERATOR WITH A LOW CONTENT OF IMPURITIES

BACKGROUND OF THE INVENTION

The present invention relates to oxygen generators, and more particularly to chemical oxygen generators for use in aircraft in combination with individual breathing masks in the event of a depressurization of the aircraft.

Conventional oxygen generators of this type usually comprise an oxygen generating loaf or block, for example based on an alkaline metal chlorate whose ignition is ensured by a fuse of the electric or percussion type which is located in the same enclosure as the generating block.

Consequently, the oxygen given off by the generating block contains appreciable amounts of impurities harmful to the breathing system, which must be eliminated.

However, the content of impurities in the oxygen may be difficult to maintain at acceptable values, above all in the course of the period during which the primer operates.

SUMMARY OF THE INVENTION

An object of the invention is to overcome the drawbacks of the known oxygen generators by providing an oxygen generator which is capable of delivering a gas whose impurity content is reduced to a minimum.

The invention therefore provides an oxygen generator comprising a casing containing an oxygen generating block the initiation of which is ensured by a primer which is actuated by manual control means, wherein said primer is a thermal primer separated by a gas impervious screen from the material of the gas generating block.

BRIEF DESCRIPTION OF THE DRAWINGS

A better understanding of the invention will be had from the following description of a preferred embodiment of the invention which is given merely by way of example with reference to the accompanying drawings, in which.

DETAILED DESCRIPTION OF THE PREFERRED EMBODIMENTS

Figure 1:
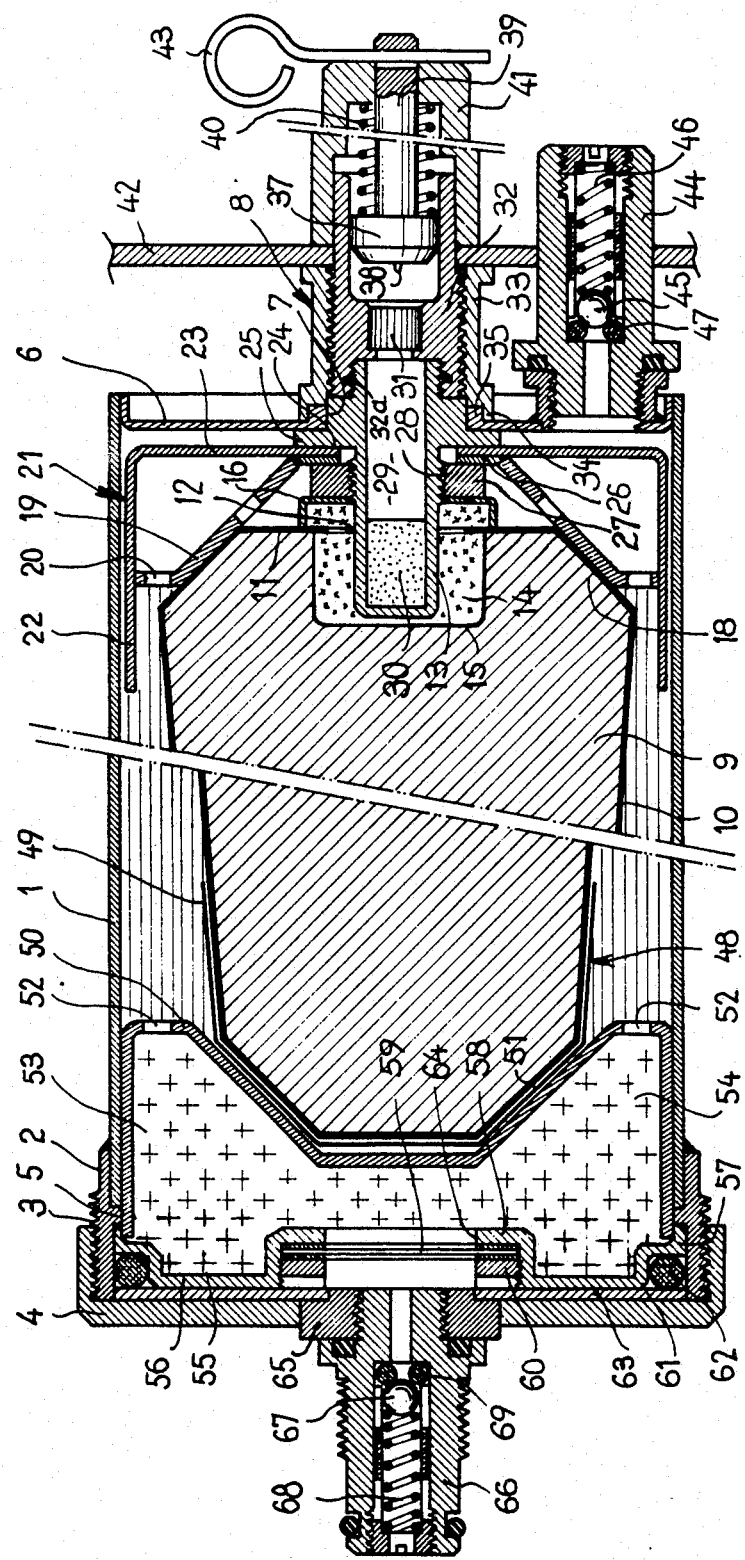
FIG. 1 is an elevational and sectional view of an oxygen generator according to the invention.

The oxygen generator represented in FIG. 1 comprises a body formed by an outer casing 1 at one end of which is secured by welding a ring 2 having a lateral surface a part of which carries a screwthread 3 on which a cover 4, for example of brass, is screwthreadedly engaged. The ring 2 has an inwardly extending flange 5 which constitutes an abutment for the end of the outer casing 1.

The outer casing 1 is provided at its end opposed to the ring 2 with an end wall 6 having an axial orifice 7 in which a thermal primer 8 of an oxygen generator block 9 is mounted. The block 9 is contained in an inner casing 10 having a generally frustoconical shape disposed inside the outer casing 1. This inner casing is made from a fabric of refractory fibres devoid of traces of hydrocarbons.

The oxygen generating block is advantageously based on an alkaline metal chlorate. On its side 11 facing the thermal primer 8, the inner casing 10 includes an axial orifice 12 in which is engaged a thermal screen 13 which is impervious to the gases of the primer 8. The thermal screen is advantageously made from stainless steel. The end portion of the screen 13 which extends into the oxygen generating block 9 is surrounded by an axial chamber 14 which is hollowed out from the material of the block 9 and adapted to contain a transmission composition 15. The transmission composition is for example the following: sodium chlorate ($ClO_3Na$) 60%, iron (Fe) 30%, potassium permanganate ($KMnO_4$) 10%. Inside the inner casing 10, the thermal screen 13 of the primer 8 is surrounded by a sealing cup 16 made for example from brass. The end wall 11 of the inner casing 10 includes a frustoconical flange 18 against which bears a lining 19 of stainless steel provided with orifices 20 putting all the parts of the intermediate space between the outer casing 1 and the inner casing 10 in communication with each other. The lining 19 is welded in a housing 21 which is of cylindrical shape and also made from stainless steel and has a lateral skirt 22 which extends inside the space defined by the casings 1 and 10 in about one third of the length of the outer casing 1. The inner wall 23 of the housing 21 is applied against a flange 25 in one piece with the thermal screen and bearing against the inner wall 6 of the outer casing 1. The end of the lining 19 is formed by a mounted washer 26 which is applied against the inner wall 23 of the housing 21 by a nut 27 cooperating with a screwthreaded portion 28 of the thermal screen 13.

This thermal screen defines a chamber 29 in which is disposed a gas-free composition 30 which generates heat under the action of a fuse 31 disposed in a fuse-carrier 32 fixed to the end of the thermal screen 13 projecting out of the end wall 6 of the outer casing 1. The composition 30 has for example the following constituents: Fe: 50%, $KMno_4$: 50%. The fuse-carrier 32 is externally screwthreaded and a tapped sleeve 33 constituting a spacer member and screwthreadedly engaged on the fuse-carrier 32, has its end applied against the outer surface of the end wall 6 of the outer casing 1. The sleeve 33 is provided with a flange 34 which cooperates with a flange 35 provided on the end wall 6 and surrounding the orifice 7 of the latter. Thus, the sleeve 33 ensures, by means of the fuse-carrier 32, the immobilization of the thermal screen 13 relative to the end wall 6 of the outer casing 1. The chamber 29 defined by the thermal screen 13 and closed by the fuse 31 constitutes a fluidtight chamber at altitudes on the order of 15,000 meters. For this purpose, a sealing element 32a is placed on the inner screwthread of the fuse-carrier. Disposed in the fuse-carrier 32 is a striker-carrier 37 comprising a head provided with a striker 38 and a rod 39 which is spring-biased by a coil spring 40 surrounding the rod 39 and disposed between the head and the end wall of a cap 41 through which the rod 39 extends and which is secured to a wall 42 which is part of a thermal protective enclosure of the generator.

The rod 39 of the striker-carrier is held in the armed position by a pin 43.

Mounted in the end wall 6 of the outer casing 1 is an overpressure valve 44 of the ball type 45 in which the ball is applied by a spring 46 against a seat 47 of an O-ring shape, for example made from an elastomer.

At its end opposed to the fuse, the inner casing 10 of the oxygen generating block 9 is provided with a stainless steel cup 48 which conforms to the shape of the end portion of the block 9 and has a skirt 49 which constitutes a baffle for the gases emanating from the block.

In some cases, the stainless steel cup 48 may be lined with a thermal protective screen made from refractory fibre (not shown). Disposed in contact with the end portion of the inner casing 10 provided with the cup 48 is a second housing 50 having a hollow 51 in which is disposed the corresponding end portion of the oxygen generating block 9. Formed in the housing 50 are orifices 52 which put the space defined by the outer casing 1 and inner casing 10 in communication with a chamber 53 in which a molecular sieve 54 is disposed, this sieve being adapted to trap $CO_2$ and partly CO. The space defined by the outer casing 1 and inner casing 10 on one hand, and the housings 21 and 50 on the other, is filled with glass wool or refractory fibre. The assembly consisting of the molecular sieve disposed in the housing 50 is placed in a filter carrier 56 comprising a flange 57 by which it bears against the inwardly extending flange 5 of the ring 3. The filter carrier 56 has in its central part a recess 58 in which is disposed a filter 59 formed by a metal netting having a mesh size of no more than $40\mu$. The filter 59 is secured in the recess 58 by means of a retaining nut 60. The filter carrier 56 further comprises a peripheral annular shoulder 61 on which is mounted a sealing O-ring 62 which is applied against the filter carrier by the cover 4 with interposition of a bearing gasket 63. The recess 58 of the filter carrier includes a central orifice 64 through which it is put in communication with the molecular sieve 54.

Mounted in the cover 4 is a plug 65 which is internally screwthreaded and in which is screwthreadedly engaged an outlet valve 66 provided with a ball check-valve 67 whose ball has a thrust set by a spring 68 and is applied against a O-ring seat 69 made for example from an elastomer.

The oxygen generator just described operates in a manner which will be clear from its construction. Indeed, when the pin 43 is withdrawn, the striker 38 strikes against the fuse 31 which ignites the composition 30 by producing heat which is sufficient to ensure the initiation of the procedure producing oxygen from the oxygen generating block 9. The presence of the thermal screen 13 which transmits the heat to the chamber 14 containing the transmission composition 15 prevents the penetration to the interior of the generator of any gas coming from the fuse 31 and from the composition 30 so that the impurities contained in the gas produced by the generating block 9 are due only to the reaction of the oxygen generating block itself. Thus, it is clear that, in contradistinction to what occurs in conventional oxygen generators, the generator according to the invention considerably reduces the peak of the content of impurities such as $CO_2$ and CO at the beginning of the operation.

The gases produced by the block 9 pass through the mass of glass wool and the orifices 20 and 52 of the lining 19 and the housing 50. At the end of the block 9 close to the housing 50, the gases have their path leading to the outlet lengthened by the cup 49 which constitutes a baffle which enables them to cool and be subjected to an improved filtration.

Thereafter, the impurities and possible fibrous particles contained in the oxygen produced by the generator are successively stopped by the molecular sieve 54 and by the metal filter 59 on the axis of the generator.

Figure 2:
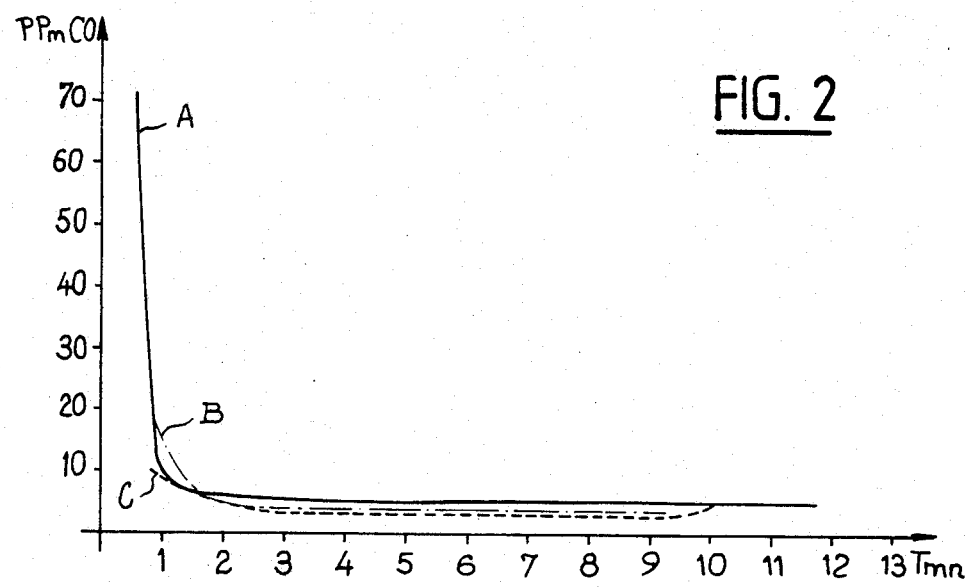
FIG. 2 is a graph showing the evolution with respect to time of the content of CO of the oxygen given off by three embodiments of oxygen generators according to the invention.
Figure 3:
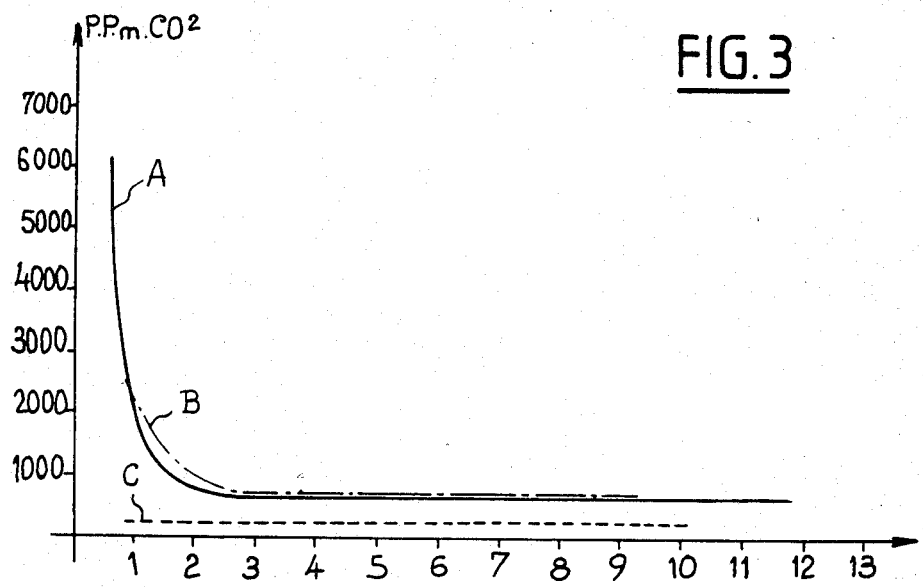
FIG. 3 is a graph similar to that of FIG. 2 showing the evolution with respect to time of the content of $CO_2$.

The performances of the oxygen generator having a thermal screen impervious to gas according to the invention are shown in FIGS. 2 and 3 which are respectively graphs representing the evolution with respect to time of the concentration of CO and $CO_2$ in respect of three embodiments of oxygen generators according to the invention.

These generators are designated by the letters A, B and C respectively.

For all these generators, the oxygen generating blocks 9 are identical and have been produced by compression and fusion. The oxygen was collected in vessels which have a volume of 5 $dm^3$ and were previously rinsed with argon.

The time required to fill each vessel depends on the rate of flow of the tested generator.

The analysis of the contents of impurities CO, $CO_2$, $Cl_2$ and $H_2O$ is effected by means of "Dräger".

The generator A was constructed without use of a molecular sieve at the outlet.

It was found, at the end of the experiments, that the screen 13 of the thermal primer had undergone a fusion.

As concerns the generator B which did not include a chemical filter either, it was found that the screen 13 of the thermal primer had not deteriorated.

As concerns the generator C, in which a chemical filter was placed in the form of a molecular sieve 54, it was also found that the thermal primer screen had not deteriorated.

The evolution of the content of CO and $CO_2$ of the oxygen produced by the three generators A, B and C, is shown in FIGS. 2 and 3, in respect of the generator A, by curves in full lines, in respect of the generator B, by curves in dot-dash lines, and in respect of the generator C, by curves in dotted lines.

The authorized reference values for the contents of various impurities of the oxygen produced by the generator are the following:

Content of CO: during the first five seconds, less than 30 ppm, and then less than 15 ppm.

Content of $CO_2$: during the first thirty seconds, less than 5,000 ppm, and then less than 1,000 ppm.

Content of $Cl_2$: during the first five seconds, less than 5 ppm, and then less than 0.2 ppm.

Content of $H_2O$: less than 10 mg/l.

A study of the curves shown in FIGS. 2 and 3 will shown that the results given by the generator according to the invention are distinctly better than the values of the authorized references.

Indeed, it is clear from curve B that the content of CO is correct right from the start when the wall of the primer forms a perfect screen against the fuse gases and that the curve C shows that the performances are still further improved by the addition of a molecular sieve.

Likewise, for the same reasons as before, the content of $CO_2$ is very distinctly improved by the presence of the molecular sieve comparatively to the curves of the generators B and C. Further, although the curves of the evolution of the content of $Cl_2$ have not been shown, it has been found that this content was always less than 0.2 ppm.

As concerns the content of $H_2O$, it was less than 10 mg/l for the generators A and C, and in the neighbourhood of 10 mg/l for the generator B.

A correct operation of the outlet valves enables the pressure of operation of the generator to be partly controlled.

The association of the screen impervious to the gases of the thermal primer with a molecular sieve at the outlet of the generator ensures a considerable improvement in the purity of the oxygen obtained.

What is claimed is:

1. In an oxygen generator comprising casing means, (1, 10), a block of oxygen generating material (9) disposed within said casing means, a primer (8) for initiating said oxygen generating material, manually controlled means (37, 43) for actuating said primer, and an outlet valve (66) in said casing means for generated oxygen, the improvements characterized by: said primer comprising a thermal primer, and a thermally transmissive but gas impervious screen (13) disposed to separate the thermal primer from the oxygen generating material and thus prevent gaseous impurities produced by the primer from reaching the outlet valve.

2. A generator according to claim 1, wherein an end portion of the thermal screen is inserted in a chamber (14) hollowed out in the oxygen generating material, said chamber containing a transmission composition (15).

3. A generator according to claim 1, wherein said casing means comprises an outer casing (1) and an inner casing (10), an end portion of the thermal screen is disposed closely proximate the oxygen generating block and extends through an end wall (11) of the inner casing, and is surrounded by a sealing cup (16) fixed to the exterior of said end wall of the inner casing.

4. A generator according to claim 3, wherein the thermal screen comprises a flange (25) by which it is secured between an end wall (6) of the outer casing and a first housing (21) mounted in the outer casing.

5. A generator according to claim 3, comprising, at an end of the oxygen generating block opposed to the primer, a second housing (50) provided with apertures (52) and defining a space between the outer casing and inner casing in communication with a chamber (53) containing a molecular sieve (54).

6. A generator according to claim 5, comprising, interposed between the end of the oxygen generating block opposed to the primer and the second housing associated therewith, a cup (48) forming a baffle for gases.

7. A generator according to claim 1, wherein said thermal screen defines a sealed chamber (29) containing a heat generating gasless composition (30), said sealed chamber communicating with a fuse (31) mounted in a fuse-carrier (32) fixed to an end of the thermal screen opposite to the oxygen generating block.

8. A generator according to claim 1, wherein said thermal screen is made from stainless steel.

* * * * *